Aug. 30, 1932.  J. D. TROUP  1,874,390
POWDERED FUEL BURNER
Original Filed July 16, 1927
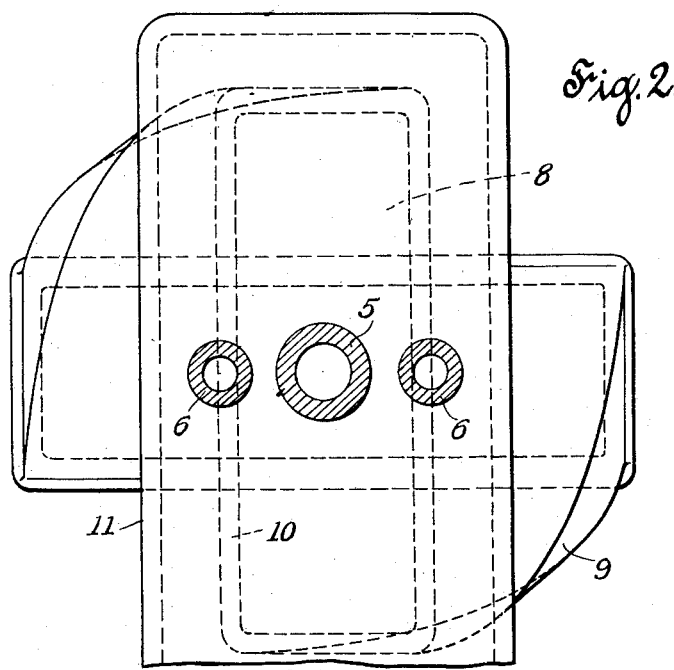
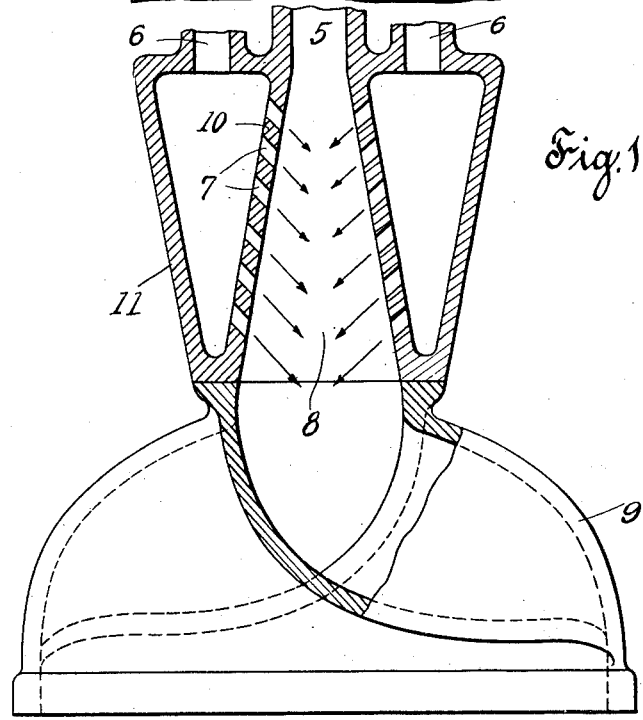
INVENTOR.
BY John D. Troup
Charles L. Wright
ATTORNEY Patented Aug. 30, 1932

1,874,390

UNITED STATES PATENT OFFICE

JOHN DAWSON TROUP, OF PURLEY, ENGLAND

POWDERED FUEL BURNER

Application filed July 16, 1927, Serial No. 206,171, and in Great Britain September 10, 1926. Renewed February 19, 1932.

This invention relates to burners used for the firing of steam generators where gaseous or powdered fuels are used, particularly the latter.

According to this invention the burner comprises two principal parts, a central fuel passage or chamber provided with angularly inclined slots or passages for the passage of the air necessary for combustion and an outer casing which encloses the wall containing the slots or passages and acts as the main air delivery to the burner. A third, additional or supplementary constructional feature of the burner is that the fuel-air mixture is given a spiral travel on its passage to the furnace, by means of an extension of the burner in spiral form.

In order that the said invention may be clearly understood and readily carried into effect, the same will now be more fully described by way of example with reference to the accompanying diagrammatic drawing in which:—

Figure 1 illustrates the burner in vertical section.

Figure 2 is a plan view of the same.

The numeral 5 denotes the supply inlet for powdered fuel, 6 the main air supply inlets, and 7 the narrow openings or passages through which the air enters to be mixed in a chamber 8. The fuel is delivered under pressure or by gravity, and compressed air is supplied.

In the illustration, the chamber 8 is rectangular in plan and pyramidal in general form, its side walls converging towards the top, which is open to the inlet 5. The openings 7 are formed angularly through each of two opposite longitudinal side walls 10 of the chamber. The angle at which these restricted openings enter the chamber 8 is such that the streams of air, from opposite passages, meet together at the axis of the chamber to impinge upon its opposite walls and by so doing create extreme turbulence and thorough mixing of the fuel and air. These combined actions are the principal methods whereby the flame length is shortened as the result of more rapid combustion.

The chamber 8, which receives the fuel at its upper end and delivers the fuel-air mixture at its lower end, may be formed spirally in order that the fuel-air mixture may enter the furnace in a spiral path. A further spiral action is given to the mixture, after leaving the chamber 8, by the addition of a rectangular hollow base 9 disposed transversely of the burner chamber 8 and formed with a connecting spiral passage as shown.

Extending divergently upward from the lower end of the chamber are opposed outer walls 11, forming with the walls 10, a chamber, triangular in cross-section, having its base upward and containing the air inlets 6 by which the openings 7 are supplied.

I claim:

A mixer for pulverized fuel and air, comprising a casing containing a rectangular chamber having downwardly divergent lateral walls, said chamber being provided with an inlet for fuel at its top and an outlet at its bottom, an outer chamber having downwardly convergent walls circumjacent the first named chamber and being provided with inlets for compressed air, the walls between the chambers having a plurality of openings therethrough, and means for directing the resulting mixture in a whirling mass into a combustion chamber.

In testimony whereof I have signed my name to this specification.

JOHN DAWSON TROUP.